United States Patent [19]
Fletcher et al.

[11] Patent Number: 4,663,074
[45] Date of Patent: May 5, 1987

[54] 2-SUBSTITUTED OXAZOLO [4,5-B] PYRIDINE LASER DYES

[75] Inventors: Aaron N. Fletcher, Ridgecrest, Calif.; Joel M. Kauffman, Wayne, Pa.

[73] Assignee: The United States of America as represented by the Secretary of the Navy, Washington, D.C.

[21] Appl. No.: 719,787

[22] Filed: Apr. 3, 1985

[51] Int. Cl.$^4$ .......................... H01S 3/10; C09K 11/06
[52] U.S. Cl. ................................ 252/301.17; 372/53; 372/54; 546/115
[58] Field of Search .................. 252/301.17; 546/115; 372/53

[56] References Cited

U.S. PATENT DOCUMENTS

| | | | |
|---|---|---|---|
| 3,314,894 | 4/1967 | Nyilas et al. | 252/301.2 |
| 3,873,940 | 3/1975 | Drexhage | 252/301.17 |
| 4,017,738 | 4/1977 | Hyman, Jr. | 250/483 |
| 4,035,740 | 7/1977 | Schafer et al. | 331/94.5 L |
| 4,038,396 | 7/1977 | Shen et al. | 546/115 |
| 4,292,527 | 9/1981 | Franks et al. | 250/483 |
| 4,506,368 | 3/1985 | Lee | 372/53 |

OTHER PUBLICATIONS

Clark et al., 2-(substituted phenyl) oxazolo[4,5-b] pyridines and 2-(substituted phenyl)oxazolo[4,5-b] pyridines as Nonacidic Antiinflammatory Agents, Journal of Medicinal Chemistry 21(11), pp. 1158–1162, 1978.

Primary Examiner—Arthur P. Demers
Attorney, Agent, or Firm—William C. Townsend; W. Thom Skeer

[57] ABSTRACT

Laser dyes of the class of 2-substituted oxazolo [4,5-b] pyridines which lase when flashlamp or nitrogen laser pumped.

10 Claims, No Drawings

2-SUBSTITUTED OXAZOLO [4,5-B] PYRIDINE LASER DYES

BACKGROUND OF THE INVENTION

1. Field of the Invention

This invention relates to the field of chemistry. More particularly, this invention relates to laser dyes. Still more particularly, but without limitation thereto, this invention relates to improved laser dyes and laser dye solutions for use with flashlamp and nitrogen laser pumped systems.

2. Description of the Prior Art

In Lee and Robb, *Water Soluble Blue-Green Lasing Dyes for Flashlamp-Pumped Dye Lasers,* IEEE Journal of Quantum Electronics QE-16, pp 777-784, July 1980, the oxazole dye 2-(4-pyridyl)-5-phenyl oxazole and its pyridinium salts were investigated. This particular salt did lase under normal type flashlamp pumping. Two of these dyes are commercially available from Aldrich Chemical Company, Inc., as dyes 23748-5 and 23749-3.

Benzoxazole and oxidazole derivatives of these pyridinium salts were prepared and did not lase even when pumped with a low power nitrogen laser. Furamoto and Ceccon, *Ultraviolet Organic Liquid Lasers,* IEEE Journal of Quantum Electronics QE-6, pp 262-268, May 1970, were able to barely lase oxazoles and benzoxazoles under conditions extremely favorable to lasing. They used a fast rise time flashlamp and highly reflective mirrors.

The dyes of the present invention are compounds which are good laser dyes in a spectral region (the 400 nm range) nearly devoid of long lived laser dyes.

SUMMARY OF THE INVENTION

An object of the present invention is to provide a new class of compounds which lase in flashlamp and nitrogen laser pumped systems.

A further object of the present invention is to provide laser dyes suitable for use in underwater communications, isotope separation and spectroscopic diagnostics.

These and other objects have been demonstrated by the present invention wherein the dye solution comprises a 2-substituted oxazolo[4,5-b]pyridine laser dye and a solvent, absolute ethanol.

DESCRIPTION OF THE PREFERRED EMBODIMENT

The particular dye used is a 2-substituted oxazolo[4,5-b]pyridine compound having the following structure:

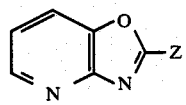

where Z is one of the following:

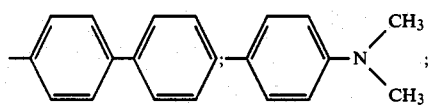

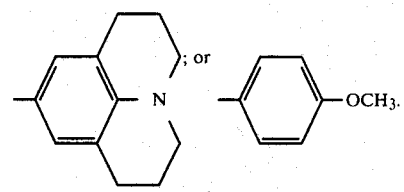

These 2-substituted oxazolo[4,5-b]pyridine compounds have the following respective names: 2-(biphenyl)oxazolo[4,5-b]pyridine, 2-(4-dimethylaminophenyl)oxazolo[4,5-b]pyridine, 2-(9,2,3,6,7-tetrahydro-1H,5H pyrido[3,2,1-ij]quinolyl)oxazolo[4,5-b]pyridine, and 2-(4-methoxyphenyl)oxazolo[4,5-b]pyridine.
These dyes were snthesized by the method described in Ger. Offen. No. 2,060,288 (24 June 1971).

Two systems are utilized: short pulse (10 ns) time duration laser pumped and flashlamp pumped which is long pulse and more demanding. The short pulse system utilized here is a nitrogen laser pump.

The nitrogen laser pumped system uses an Avco-Everett C400 nitrogen laser "Dial-a-Line" dye laser combination. The dye laser is aligned optimally at the grating sixth order for violet and ultraviolet operation and is pumped with 10 ns, 337.1 nm, minimally 20 kw pulses.

All four dyes lase when nitrogen laser pumped under air, i.e. the solvent is in equilibrium with air. Absolute ethanol is a suitable solvent, and the preferred solution is near saturation.

The flashlamp test setup utilizes a Phase-R DL-10Y triaxial flashtube, having a rise time of 200 ns. A quartz tube is used to separate the dye solution from the coolant, water. A Xenon Corporation (Wilmington, Mass.) N-851C water-cooled linear flashlamp is used at rates up to 25 Hz to degrade the dye solution, and operates at a 10 J (electrical) input. A Pyrex filter is used with the linear degradation flashlamp but not with the triaxial laser pumping lamp. In this manner, it is possible to adequately pump the bluer dyes lasing as low as 375 nm so as to have a better perspective as to whether benzoxazole dyes will indeed lase with a moderate rise time flashlamp. In Mitsuo Maeda, LASER DYES, Academic Press (New York 1984) no benzoxazole or oxadiazole dyes are mentioned as lasing with a 200 ns rise time flashlamp (Tables 26 and 28, pp 247-272). Both air (an equilibriated solution) and an inert gas such as argon, that serves to deoxygenate the solvent, are suitable cover gases. The preferred solution is $1 \times 10^{-4}M$ in absolute ethanol, for flashlamp pumping with a 5-6 mm diameter.

Three of the oxazole dye lase when flashlamp pumped. The laser dye having the Z group:

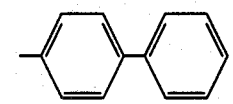

lases under argon in the lasing wavelength region of 375-381 nm, with midpoint lasing at 378 nm. This dye does not lase under air.

Table 1 provides the flashlamp pumped lasing characteristics of the laser dye having the Z group:

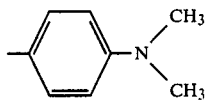

This dye lases using both air and argon cover gases.

TABLE 1

| Cover Gas | Slope Efficiency $k_0 \times 10^3$ | Threshold $t_0$, J | Lasing Lifetime Constant $1/c$, MJdm$^{-3}$ | Lasing Wavelength, nm | Midpoint Lasing, nm |
| --- | --- | --- | --- | --- | --- |
| Air | 0.87 | 20.9 | 0.21 | 433.6–450.1 | 441.9 |
| Argon | 0.64 | 24.9 | 8.4 | 433.6–451.2 | 442.4 |

Table 2 gives the lasing characteristics of the flashlamp pumped laser dye having the Z group:

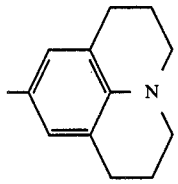

This dye lases using both air and argon cover gases.

TABLE 2

| Cover Gas | Slope Efficiency $k_0 \times 10^3$ | Threshold $t_0$, J | Lasing Lifetime Constant $1/c$, MJdm$^{-3}$ | Lasing Wavelengths, nm | Midpoint Lasing nm |
| --- | --- | --- | --- | --- | --- |
| Air | 1.9 | 19.5 | 1.4 | 449.1–467.8 | 458.4 |
| Argon | 0.9 | 12.6 | 5.2 | 447.9–468.9 | 458.4 |

The above mentioned compounds are the first dyes of this type reported to lase when flashlamp pumped. Previously, other similar compounds such as benzoxazoles and oxadiazoles were not found to lase under the same conditions.

This invention has been described in detail with particular reference to certain preferred embodiments thereof, but it will be understood that variations and modifications can be effected within the spirit and scope of the invention.

What is claimed is:

1. A dye laser comprising a laser dye solution coupled with a pumping energy source capable of producing stimulated emission of the dye solution, the dye solution comprising a lasing concentration in a non-interfering solvent of a 2-substituted oxazolo[4,5-b]pyridine dye having the structure:

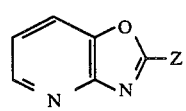

where Z is selected from the group consisting of:

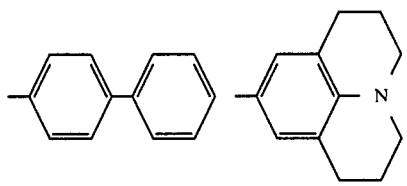

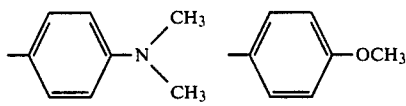

wherein said solvent is absolute ethanol.

2. A method of producing coherent laser emission in the operation of a dye laser comprising the steps of:
optically pumping a dye solution to produce an inversion of energy states in the population of dye molecules; and
stimulating therein an emission of a coherent beam of radiation, wherein said solution comprises a lasing concentration in a non-interfering solvent of a 2-substituted oxazolo[4,5-b]pyridine dye having the structure:

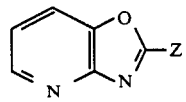

where Z is selected from the group consisting of:

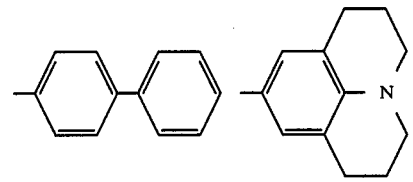

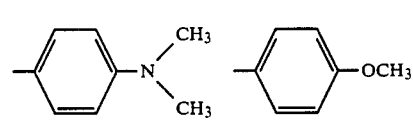

3. A dye laser comprising a laser dye solution coupled with a pumping energy source capable of producing stimulated emission of the dye solution, the dye solution comprising a laser concentration in a non-interfering solvent of a 2-substituted oxazolo[4,5-b]pyridine dye having the structure:

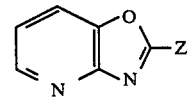

where Z is selected from the group consisting of:

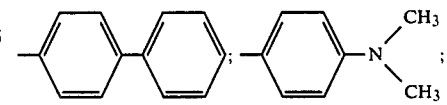

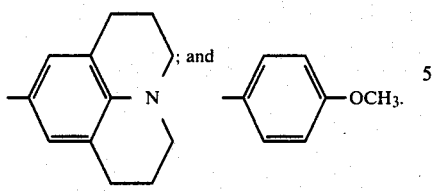

4. A dye laser comprising a laser dye solution coupled with a pumping energy source capable of producing stimulated emission of the dye solution, the dye solution comprising a lasing concentration in a non-interfering solvent of a 2-substituted oxazolo[4,5-b]pyridine dye having the structure:

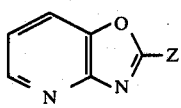

where Z is selected from the group consisting of:

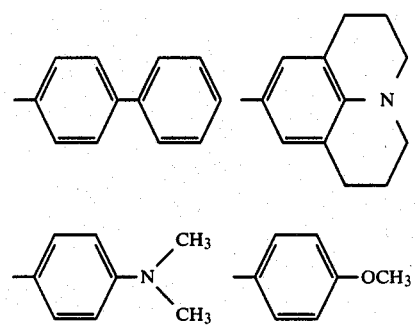

further including a cover gas comprising air wherein said cover gas is in equilibrium with said solvent.

5. A dye laser comprising a laser dye solution coupled with a pumping energy source capable of producing stimulated emission of the dye solution, the dye solution comprising a lasing concentration in a non-interfering solvent of a 2-substituted oxazolo[4,5-b]pyridine dye having the structure:

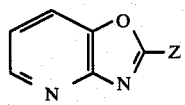

where Z is selected from the group consisting of:

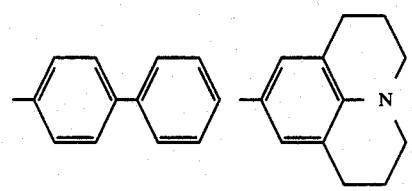

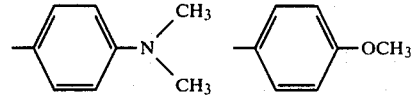

further including a cover gas comprising an inert gas wherein said solvent is deoxygenated by flushing with said cover gas.

6. A dye laser comprising a laser dye solution coupled with a pumping energy source capable of producing stimulated emission of the dye solution, the dye solution comprising a lasing concentration in a non-interfering solvent of a 2-substituted oxazolo[4,5-b]pyridine dye having the structure:

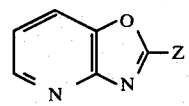

where Z is selected from the group consisting of:

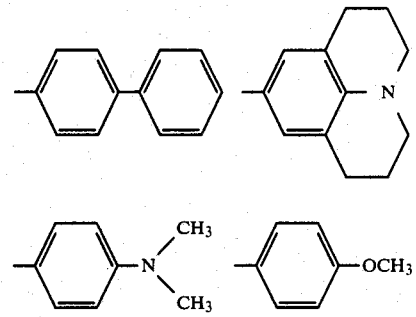

wherein said pumping energy source capable of producing stimulated emission of the dye solution is a flashlamp pumping energy source and said dye solution has a molar concentration of approximately $1 \times 10^{-4}$M.

7. A dye laser comprising a laser dye solution coupled with a pumping energy source capable of producing stimulated emission of the dye solution, the dye solution comprising a lasing concentration in a non-interfering solvent of a 2-substituted oxazolo[4,5-b]pyridine dye having the structure:

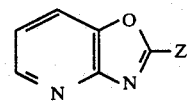

where Z is selected from the group consisting of:

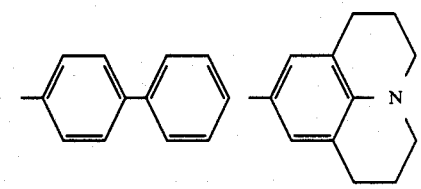

-continued

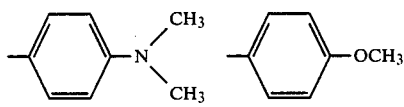

wherein said pumping energy source capable of producing stimulated emission of the dye solution is a nitrogen pumping energy source and said dye solution is a solution near saturation.

8. A method of producing coherent laser emission in the operation of a dye laser comprising the steps of:
optically pumping a dye solution to produce an inversion of energy states in the population of dye molecules; and
stimulating therein an emission of a coherent beam of radiation, wherein said solution comprises a lasing concentration in a non-interfering solvent of a 2-substituted oxazolo[4,5-b]pyridine dye having the structure:

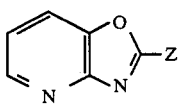

where Z is selected from the group consisting of:

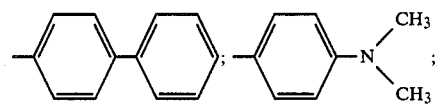

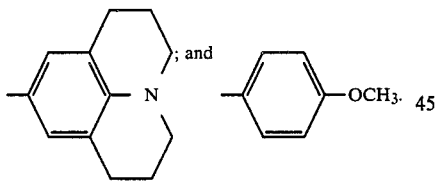

9. A method of producing coherent laser emission in the operation of a dye laser comprising the steps of:
optically pumping a dye solution to produce an inversion of energy states in the population of dye molecules; and
stimulating therein an emission of a coherent beam of radiation, wherein said solution comprises a lasing concentration in a non-interfering solvent of a 2-substituted oxazolo[4,5-b]pyridine dye having the structure:

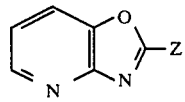

where Z is selected from the group consisting of:

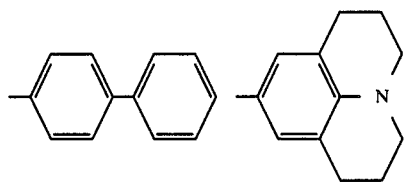

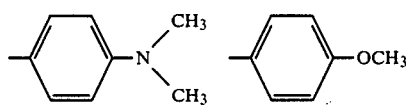

further including a cover gas comprising air wherein said cover gas is in equilibrium with said solvent.

10. A method of producing coherent laser emission in the operation of a dye laser comprising the steps of:
optically pumping a dye solution to produce an inversion of energy states in the population of dye molecules; and
stimulating therein an emission of a coherent beam of radiation, wherein said solution comprises a lasing concentration in a non-interfering solvent of a 2-substituted oxazolo[4,5-b]pyridine dye having the structure:

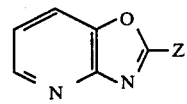

where Z is selected from the group consisting of:

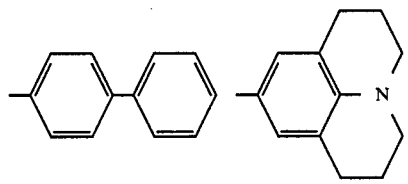

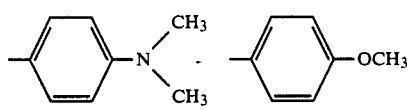

further including a cover gas comprising an inert gas wherein said solvent is deoxygenated by flushing with said cover gas.

* * * * *